(12) United States Patent
Aarnio (10) Patent No.: US 7,548,559 B2
(45) Date of Patent: Jun. 16, 2009

(54) METHODS AND APPARATUS FOR PROVIDING A HEADER RESYNCHRONIZATION SYSTEM FOR A BROADBAND WIRELESS ACCESS NETWORK

(75) Inventor: Steven J. Aarnio, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 494 days.

(21) Appl. No.: 11/373,422

(22) Filed: Mar. 10, 2006

(65) Prior Publication Data

US 2007/0211758 A1    Sep. 13, 2007

(51) Int. Cl.
*H04J 3/22* (2006.01)
*H04J 3/24* (2006.01)
(52) U.S. Cl. .................. 370/469; 370/474; 370/471
(58) Field of Classification Search ........... 370/345, 370/341, 342, 349, 470, 471, 473, 474; 709/223, 709/224, 225; 369/24.01, 30.01, 30.03, 30.1, 369/30.11
See application file for complete search history.

(56) References Cited

U.S. PATENT DOCUMENTS 5,566,170 A * 10/1996 Bakke et al. ............. 370/392
6,169,992 B1 * 1/2001 Beall et al. .............. 707/103 R
2005/0207446 A1 * 9/2005 Hadad .................... 370/474
2007/0160083 A1 * 7/2007 Un et al. ................. 370/470

FOREIGN PATENT DOCUMENTS

WO    WO2005/096553    * 10/2005

\* cited by examiner

*Primary Examiner*—Chi H Pham
*Assistant Examiner*—Fan Ng
(74) *Attorney, Agent, or Firm*—Schwabe, Williamson & Wyatt, P.C.

(57) ABSTRACT

Embodiments of methods and apparatus for providing a header resynchronization system for a broadband wireless access network are generally described herein. In various embodiments, the resynchronization system may avoid unnecessarily discarding one or more portions of data within a data region of a Protocol Data Unit. Other embodiments may be described and claimed.

21 Claims, 4 Drawing Sheets

METHODS AND APPARATUS FOR PROVIDING A HEADER RESYNCHRONIZATION SYSTEM FOR A BROADBAND WIRELESS ACCESS NETWORK

TECHNICAL FIELD

The present disclosure relates generally to wireless communication systems, and more particularly, to methods and apparatus for providing a header resynchronization system for a broadband wireless access network.

BACKGROUND

The 802.16 family of standards were developed by the Institute of Electrical and Electronic Engineers (IEEE) to provide for fixed, portable, and/or mobile broadband wireless access networks (e.g., the IEEE std. 802.16-2004, published Sep. 18, 2004, the IEEE std. 802.16e, approved Dec. 7, 2005, etc.). The Worldwide Interoperability for Microwave Access (WiMAX) Forum facilitates the deployment of broadband wireless networks based on the IEEE 802.16 standards. In particular, the WiMAX Forum ensures the compatibility and inter-operability of broadband wireless equipment. For convenience, the terms "802.16" and "WiMAX" may be used interchangeably throughout this disclosure to refer to the IEEE 802.16 suite of air interface standards.

WiMAX is a wireless technology to deliver last-mile broadband connectivity in a larger geographical area than other wireless technology such as Wireless Fidelity (Wi-Fi). In particular, WiMAX technology may provide broadband or high-speed data connection to various geographical locations where wired transmission may be too costly, inconvenient, and/or unavailable. In one example, WiMAX technology may offer greater range and bandwidth to enable T1-type service to businesses and/or cable/digital subscriber line (DSL)-equivalent access to homes.

DETAILED DESCRIPTION

In general, methods and apparatus for providing a header resynchronization system for a broadband wireless access (BWA) network are described herein. The methods and apparatus described herein are not limited in this regard.

Figure 1:
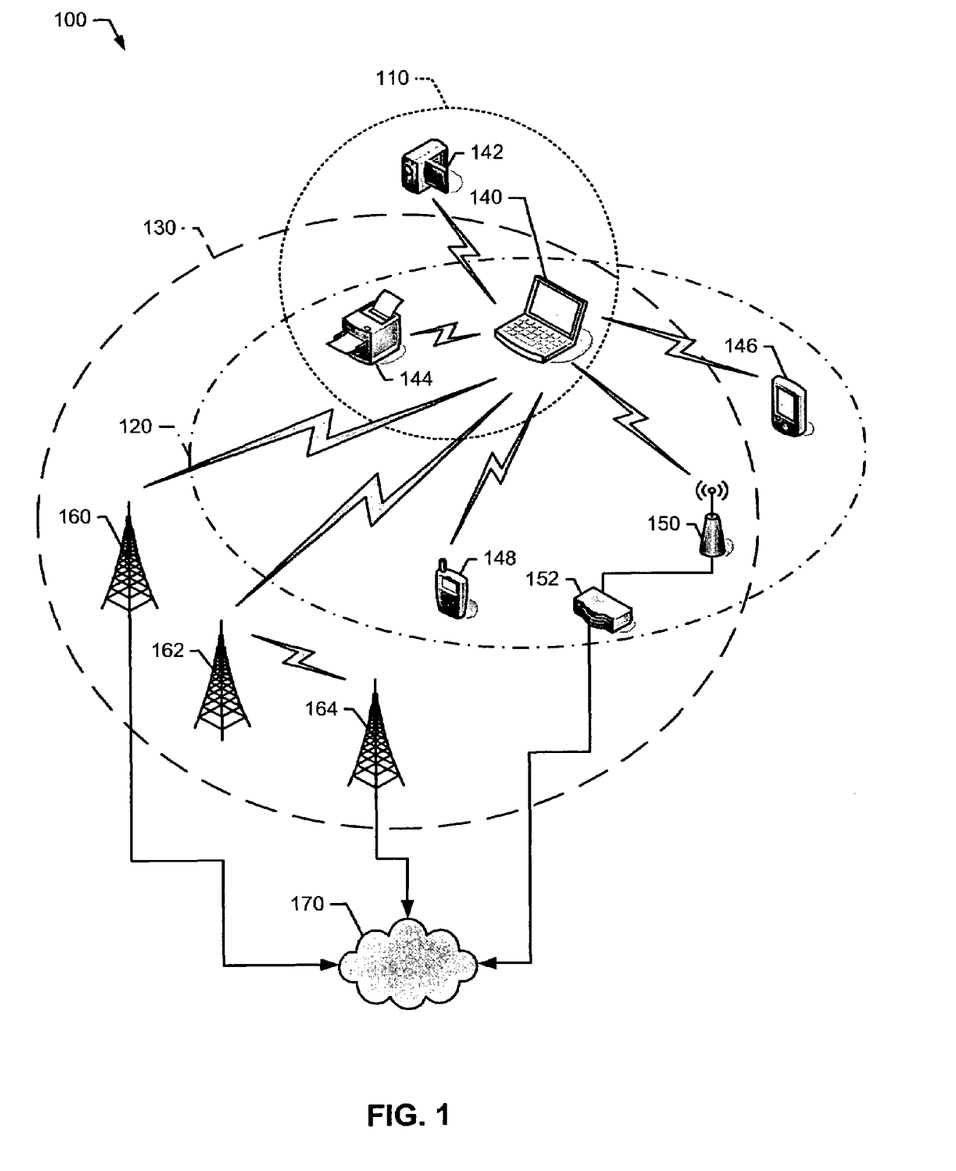
FIG. 1 is a schematic diagram representation of an example wireless communication system according to an embodiment of the methods and apparatus disclosed herein.

Referring to FIG. 1, an example wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), a set-top box, and/or other suitable relatively stationary, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, orthogonal frequency division multiple access (OFDMA), multi-carrier modulation (MDM), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM and/or OFDMA modulation to transmit large amounts of digital data by splitting a radio frequency signal into multiple small sub-signals, which in turn, are transmitted simultaneously at different frequencies. In particular, the laptop computer 140 may use OFDM and/or OFDMA modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16-2004, the IEEE std. 802.16e, etc.) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, WiMAX Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards. Although FIG. 1 depicts a WPAN, a WLAN, and a WMAN, the wireless communication system 100 may include other combinations of WPANs, WLANs, WMANs, and/or WWANs. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager-system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
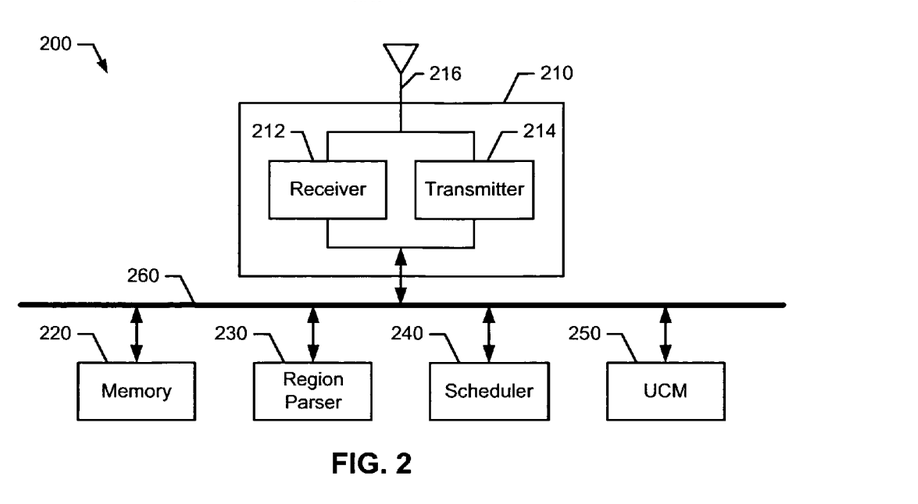
FIG. 2 is a block diagram representation of an example header resynchronization system associated with a broadband wireless access network.

In the example of FIG. 2, a communication node 200 may include a communication interface 210, a memory 220, a region parser 230, a scheduler 240, and an uplink connections manager (UCM) 250. For example, the communication node 200 may be a subscriber station (e.g., the laptop computer 140 of FIG. 1) or a base station (e.g., the base station 160 of FIG. 1). Although FIG. 2 depicts components of the communication node 200 coupling to each other via a bus 260, these components may be operatively coupled to each other via other suitable direct or indirect connections (e.g., a point-to-point connection or a point-to-multiple point connection). While FIG. 2 depicts particular components, the communication node 200 may include other suitable components (not shown) to operate within a wireless communication network.

In addition, although the components shown in FIG. 2 are depicted as separate blocks within the communication node 200, the functions performed by some of these blocks may be integrated within a single semiconductor circuit or may be implemented using two or more separate integrated circuits. For example, although the receiver 212 and the transmitter 214 are depicted as separate blocks within the communication interface 210, the receiver 212 may be integrated into the transmitter 214 (e.g., a transceiver). In another example, while the region parser 230, the scheduler 240, and the UCM 250 are depicted as separate blocks within the communication node 200, the region parser 230, the scheduler 240, and the UCM 250 may be integrated into a single component. Further, the components depicted in FIG. 2 may be embodied exclusively in hardware, exclusively in software, exclusively in firmware or in some combination of hardware, software, and/or firmware.

The communication interface 210 (e.g., a radio-frequency (RF) physical-layer (PHY) sub-system) may include a receiver 212, a transmitter 214, and an antenna 216. The communication interface 210 may receive and/or transmit data via the receiver 212 and the transmitter 214, respectively. The antenna 216 may include one or more directional or omni-directional antennas such as dipole antennas, monopole antennas, patch antennas, loop antennas, microstrip antennas, and/or other types of antennas suitable for transmission of RF signals. Although FIG. 2 depicts a single antenna, the communication node 200 may include additional antennas. For example, the communication node 200 may include a plurality of antennas to implement a multiple-input-multiple-output (MIMO) system.

Briefly, the communication node 200 (e.g., via the communication interface 210) may receive one or more frames and provide one or more data regions (e.g., the data region 300 of FIG. 3) to the region parser 230. Accordingly, the region parser 230 may parse one or more data regions to find individual units of data and discard any padding added to the end of a data region. As described in detail below and in connection with FIG. 3, each data region may include one or more protocol data units (PDUs) (e.g., 310, 320, 330, and/or 350 of FIG. 3).

Figure 3:
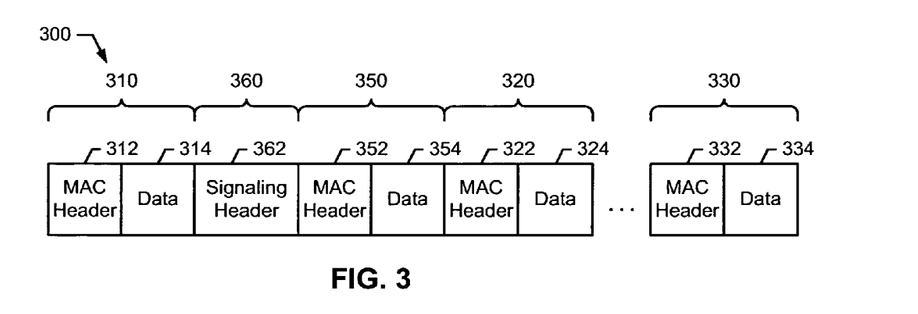
FIG. 3 depicts an example data region.

Turning to FIG. 3, for example, a data region 300 (e.g., up-link burst data) may include one or more PDUs with data payloads, generally shown as 310, 320, 330, and 350 (e.g., data PDUs). Each of the PDUs 310, 320, 330, and 350 may include a protocol-defined MAC header, generally shown as 312, 322, 332, and 352, respectively. Each of the MAC headers 312, 322, 332, and 352 may be associated with data, generally shown as 314, 324, 334, and 354, respectively. For example, the MAC header 312 may be followed by data 314, the MAC header 322 may be followed by data 324, the MAC header 332 may be followed by data 334, and the MAC header 352 may be followed by data 354.

The data region 300 may include one or more PDUs without data payload, generally shown as 360 (e.g., signaling-header PDUs). In particular, the PDU 360 may include a signaling header (or a MAC signaling header), generally shown as 362. The signaling header 362 may be followed by the MAC header 352 and the corresponding data 354. In one example, the signaling header 362 may be a bandwidth request (BR) header to request for additional bandwidth for transmission. Although FIG. 3 depicts a particular order of fields, the data region 300 may be structured in other sequences. In addition, while FIG. 3 depicts five PDUs, the data region 300 may include more or less PDUs. The methods and apparatus described herein are not limited in this regard.

Figure 4:
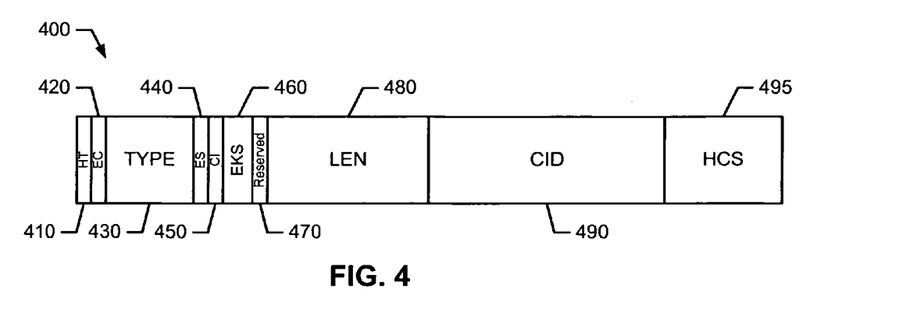
FIG. 4 depicts an example media access control (MAC) header defined in accordance with a wireless communication protocol.

As described in connection with FIG. 4, each of the MAC headers 312, 322, 332, and 352 may include a plurality of fields (e.g., 410, 420, 430, 440, 450, 460, 470, 480, 490 and/or 495 of FIG. 4). In the example of FIG. 4, a generic MAC header or a protocol-defined MAC header 400 may be formatted or structured in accordance with the IEEE 802.16 family of standards or other suitable wireless communication protocols (e.g., the IEEE std. 802.16-2004). In particular, the protocol-defined MAC header 400 may include a header type (HT) field 410, an encryption control (EC) field 420, a type field 430, an extended sub-header (ES) field 440, a cyclic redundancy check (CRC) indicator (CI) field 450, an encryption key sequence (EKS) field 460, a reserved field 470, a length (LEN) field 480, a connection identifier (CID) field 490, and a header check sequence (HCS) field 495.

Briefly, the HT field 410 may be a one-bit field to indicate the type of header (e.g., a protocol-defined MAC header or a signaling header). For example, the HT field 410 may be set to a value of zero to indicate a MAC header. The EC field 420 may also be a one-bit field. In one example, the EC field 420 may be set to a value of zero to indicate that the payload (e.g., data) is not encrypted. Accordingly, the EC field 420 may be set to a value of one to indicate that the payload is encrypted. The type field 430 may be a six-bit field indicating the payload type including presence of sub-headers. The extended sub-header field 440 may be a one-bit field. The CI field 450 may be a one-bit field indicating whether a CRC is appended to the PDU associated with the protocol-defined MAC header 400. In one example, the CI field 450 may be set to a value of zero to indicate that a CRC is not appended to the PDU associated with the protocol-defined MAC header 400. Alternatively, the CI field 450 may be set to a value of one to indicate that a CRC is appended to the PDU associated with the protocol-defined MAC header 400.

The EKS field 460 may be a two-bit field to indicate an index of a traffic encryption key and initialization vector used to encrypt the payload. The reserved field 470 may be a one-bit field. The LEN field 480 may be an eleven-bit field indicating the length of the PDU associated with the protocol-defined MAC header 400 (e.g., including bytes of the protocol-defined MAC header 400). The CID field 490 may be a sixteen-bit field to identify the connection between the transmitting and receiving parties of the PDU associated with the protocol-defined MAC header 400. The HCS field 495 may be an eight-bit field including a value used to detect errors in the protocol-defined MAC header 400.

Although the above example describes particular types of fields, the protocol-defined MAC header 400 may include other suitable types of fields. Alternatively, the protocol-defined MAC header 400 may be without one or more fields depicted in FIG. 4. Also, the fields of the protocol-defined MAC header 400 may be formatted or structured in other sequences. Further, while the above example describes each field as having a particular number of bits, each of the fields may be of other suitable size. The methods and apparatus described herein are not limited in this regard.

Turning back to FIG. 2, the region parser 230 may examine the MAC header of each PDU in the data region 300 (FIG. 3) to determine whether the MAC header is valid, the header type, and the length of data associated with the PDU, if any. The region parser 230 may identify each PDU as a either a signaling-header PDU or a data PDU based on the corresponding MAC header. For further processing, the region parser 230 may pass signaling-header PDUs and data PDUs to other system modules (e.g., the scheduler 240 and/or the UCM 250). In one example, the scheduler 240 may handle bandwidth requests, and the UCM 250 may receive a PDU with a valid protocol-defined MAC header.

However, the data region 300 may include one or more transmission errors. In one example, if an invalid header is found, the region parser 230 may attempt to locate the next valid MAC header in the data region 300. All data from the beginning of the invalid header to the beginning of the next valid MAC header may be discarded. If the region parser 230 fails to find a valid MAC header, the remainder of the data region 300 is discarded. The methods and apparatus described herein are not limited in this regard.

Figure 5:
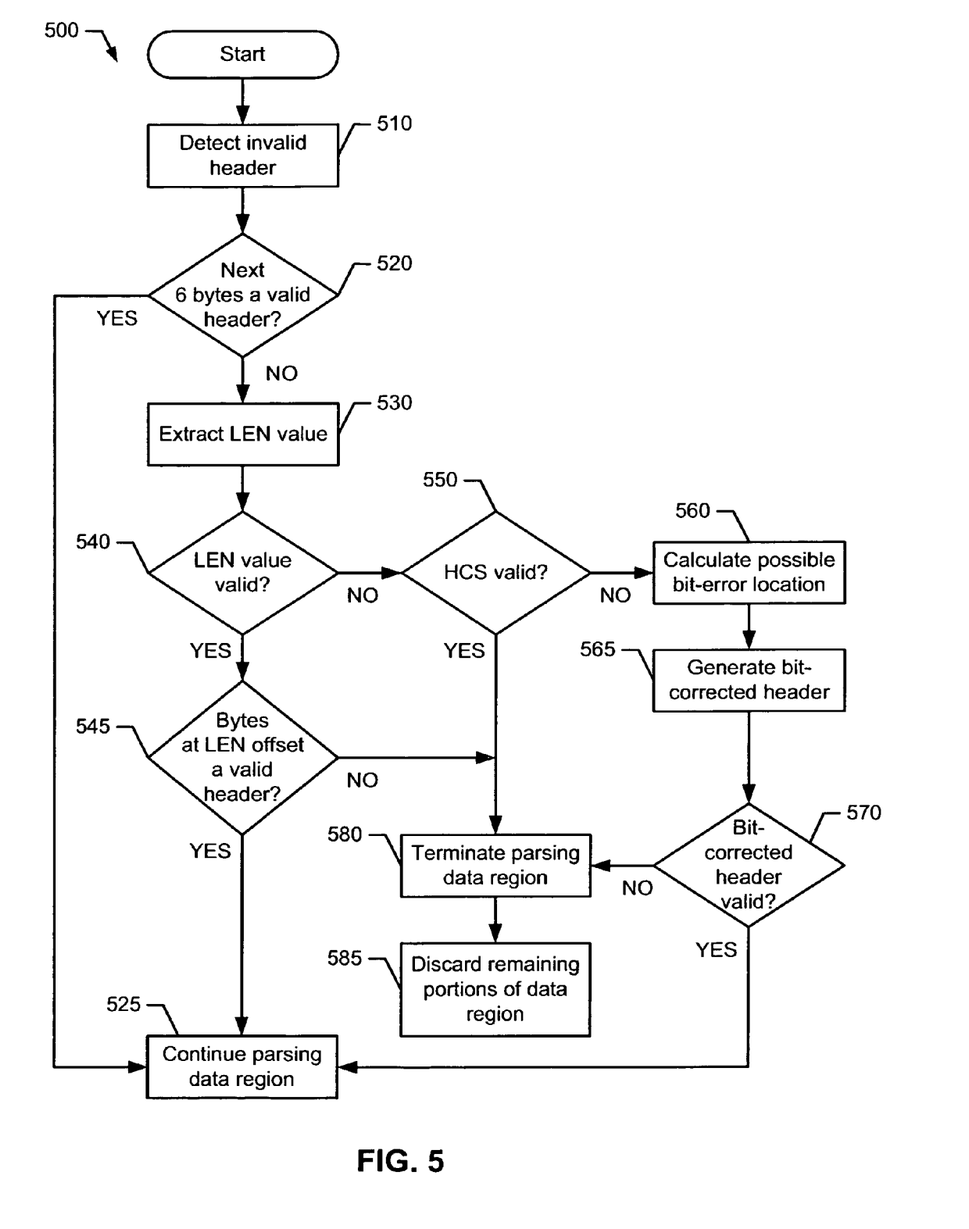
FIG. 5 is a flow diagram representation of one manner in which the example header resynchronization system of FIG. 3 may be configured.

FIG. 5 depicts one manner in which the example communication node 200 of FIG. 2 may be configured to provide a header resynchronization system. The example process 500 of FIG. 5 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although FIG. 5 depicts a particular order of actions, these actions may be performed in other temporal sequences. Again, the example process 500 is merely provided and described in conjunction with the apparatus of FIG. 2 as an example of one way to configure a communication node to provide a header resynchronization system.

In the example of FIG. 5, the process 500 may begin with the region parser 230 detecting an invalid header (block 510). In one example, the region parser 230 may receive the data region 300 (FIG. 3) to extract one or more PDUs (e.g., 310, 320, 330 and/or 350). The data region 300 may include one or more errors. In particular, the region parser 230 may detect an invalid header based on a header type field, an encryption control field, or a type field of a header associated with a PDU. To avoid unnecessarily discarding one or more portions of the data region 300, the region parser 230 may skip ahead to find the next valid MAC header and continue processing from that point. Accordingly, the region parser 230 may assume that any invalid header is a signaling header and proceed to determine whether a portion of the data region 300 adjacent or proximate to the invalid header includes a valid MAC header (block 520). For example, a wireless communication protocol (e.g., the IEEE 802.16 family of standards) may define a MAC header to be six bytes. As a result, the region parser 230 may determine whether the next six bytes of the data region 300 includes a valid MAC header (e.g., the six bytes immediately following the invalid header, which is assumed to be a signaling header).

In one example, the region parser 230 may identify the invalid header as the signaling header 362 (FIG. 3) to determine whether a portion subsequent of the data region 300 to the invalid header includes a valid MAC header. Accordingly, the region parser 230 may determine whether the next six bytes of the data region 300 immediately following the signaling header 362 (FIG. 3) includes a valid MAC header. If the next six bytes includes a valid MAC header, the region parser 230 may continue to parse the data region 300 as the region parser 230 identified a valid MAC header (block 525 of FIG. 5). Following the above example, the region parser 230 may determine whether the MAC header 352 (FIG. 3) is a valid MAC header. If the MAC header 352 is a valid MAC header, the region parser 230 may continue to parse the data region 300 from the MAC header 352.

Otherwise if the region parser 230 determines that the next six bytes of data region 300 does not include a valid MAC header at block 520, the region parser 230 may process the invalid header as a protocol-defined MAC header (e.g., the protocol-defined MAC header 400 of FIG. 4). One or more characteristics of the protocol-defined MAC header may be defined by a wireless communication protocol. In one example, the protocol-defined MAC header 400 may be structured or formatted in accordance with the IEEE 802.16 family of standards. In particular, the region parser 230 may extract an LEN value from the invalid header (block 530). For example, the region parser 230 may extract the LEN value from the LEN field 480 (FIG. 4). Accordingly, the region parser 230 may determine whether the extracted LEN value is valid (block 540). The region parser 230 may compare the extracted LEN value to the remaining size of the data region. The extracted LEN value may be valid if the length fits within the remaining size of the data region 300. In one example, the extracted LEN value may indicate that the PDU 350 has a length of twenty bytes. Thus, the PDU 320 (e.g., the next PDU proximate to the PDU 350) should begin twenty bytes from the beginning of the protocol-defined MAC header 352. If the extracted LEN value is valid, the region parser 230 may determine whether the bytes at the LEN offset include a valid MAC header (block 545). For example, the region parser 230 may determine whether the six bytes immediately following the PDU 350 includes a valid MAC header (e.g., whether the MAC header 322 of the PDU 320 is a valid MAC header).

If the six bytes at the LEN offset includes a valid MAC header at block 545, controls may proceed to block 525 as described above. In particular, the region parser 230 may resynchronize the parsed region and parsing may continue from the location of the next valid MAC header (e.g., the MAC header 322). Otherwise if the six bytes at the LEN offset does not include a valid MAC header at block 545, the region parser 230 may terminate parsing of the data region 300 (block 580). The region parser 230 may terminate the search for a valid MAC header as the error is unrecoverable. Further, the region parser 230 may discard any remaining portions (e.g., bytes) of the data region 300 (block 585).

Referring back to block 540, if the LEN value is not valid, the region parser 230 may determine whether the transmitted HCS value (e.g., the HCS value of the HCS field 495 in FIG. 4) is valid (block 550). In one example, the region parser 230 may compare the HCS value stored in the HCS field 495 (FIG. 4) to an internally-calculated HCS value of the communication node 200. If the transmitted HCS value is valid (e.g., the transmitted HCS value and the internally-calculated HCS value are equal), controls may proceed to blocks 580 and 585 to terminate parsing of the data region 300 and to discard any remaining portions of the data region 300, respectively, as described above.

Otherwise if the transmitted HCS value is not valid at block 550 (e.g., the transmitted HCS value and the internally-calculated HCS value are different), the region parser 230 may determine a possible location of bit error (block 560) and generate a bit-corrected header (block 565). In particular, the region parser 230 may correct a single bit error based on the transmitted HCS value and the internally-calculated HCS value. Accordingly, the region parser 230 may determine whether the bit-corrected header is valid (block 570). Based on a header type field, an encryption control field or a type field associated with the bit-corrected header, the region parser 230 may determine whether the bit-corrected header is valid. If the bit-corrected header is valid at block 570 (e.g., the region parser 230 resynchronized the data region 300), controls may proceed to block 525 to continue parsing the data region 300. Otherwise if the bit-corrected header is not valid at block 570 (e.g., the region parser 230 did not resynchronize the data region 300), controls may proceed to blocks 580 and 585 to terminate parsing of the data region 300 and to discard any remaining bytes of the data region 300, respectively, as described above.

While FIG. 5 depicts a particular example process to provide a header resynchronization system, the process 500 may be performed without certain blocks. Alternatively, for example, the process 500 may provide a header resynchronization system without blocks 550, 560, 565, and 570. In particular, if the LEN value is not valid at block 540, the region parser 230 may proceed directly to block 580 to terminate parsing of the data region 300. The methods and apparatus described herein are not limited in this regard.

Although the methods and apparatus disclosed herein are described with respect to BWA networks, the methods and apparatus disclosed herein may be applied to other suitable types of wireless communication networks. For example, the methods and apparatus disclosed herein may be readily applicable to WPANs, WLANs, WMANs, and/or WWANs.

Figure 6:
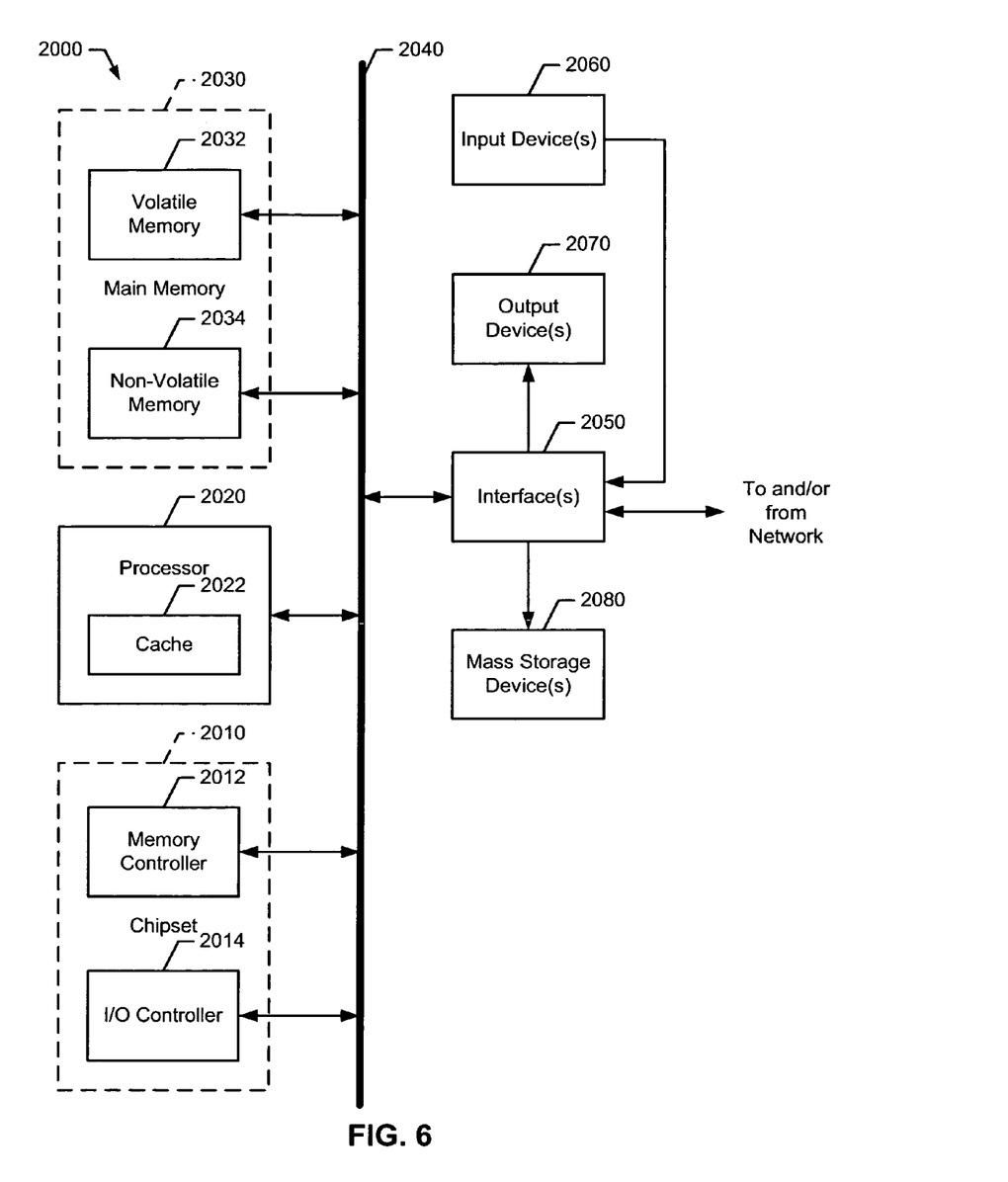
FIG. 6 is a block diagram representation of an example processor system that may be used to implement the example header resynchronization system of FIG. 2.

FIG. 6 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 6 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WPAN components, WLAN components, WMAN components, WWAN components, and/or other suitable processing components. For example, the processor 2020 may be implemented using one or more of the Intel® Core™ technology, Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, peripheral component interconnect (PCI), PCI Extended (PCI-X), and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include non-volatile RAM, floppy disks and drives, hard disk drives, compact disks and drives, and digital versatile disks (DVD) and drives.

The interface circuit 2050 may also include one or more communication devices such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
    detecting an invalid header associated with a first protocol data unit of a data region;
    monitoring for a valid media access control (MAC) header associated with a second protocol data unit of the data region, wherein the monitoring includes identifying the invalid header as a bandwidth request header and monitoring for the valid MAC header immediately following the bandwidth request header; and
    processing the invalid header as a protocol-defined header in response to a failure to detect the valid MAC header, wherein the processing includes extracting a length value associated with the invalid header and determining a length offset of the data region based on the length value to enable further monitoring for the valid MAC header, wherein the protocol-defined header having one or more characteristics defined in accordance with a wireless communication protocol.

2. A method as defined in claim 1, wherein the detecting comprises detecting a condition indicative of the invalid header based on at least one of a header type field, an encryption control field, a type field, a length field, or a header check sequence value associated with the invalid header.

3. A method as defined in claim 1, wherein processing the invalid header further comprises determining whether a header check sequence value is valid in response to a determination that the extracted length value is invalid, wherein the header check sequence value is associated with the invalid header.

4. A method as defined in claim 3, wherein processing the invalid header further comprises calculating a bit-error location in response to determination that the header check sequence value is invalid, and generating a bit-corrected header based on the bit-error location.

5. A method as defined in claim 1 further comprising parsing one or more portions of the data region subsequent to the invalid header in response to detecting at least one of a condition indicative of the valid MAC header located at a portion of the data region proximate to the invalid header, a condition indicative of the valid MAC header based on a length offset, or a condition indicative of a valid bit-corrected header.

6. A method as defined in claim 1 further comprising discarding one or more portions of the data region subsequent to the invalid header in response to at least one of a failure to detect the valid MAC header located at a portion of the data region proximate to the invalid header, a failure to detect the valid MAC header based a length offset, or a failure to detect a valid bit-corrected header.

7. An article of manufacture including content, which when accessed, causes a machine to:
    detect an invalid header associated with a first protocol data unit of a data region;
    search for a valid media access control (MAC) header associated with a second protocol data unit of the data region, wherein the searching includes identifying the invalid header as a bandwidth request header and monitoring for the valid MAC header immediately following the bandwidth request header; and
    process the invalid header as a protocol-defined header in response to a failure to detect the valid MAC header, wherein the processing includes extracting a length value associated with the invalid header and determining a length offset of the data region based on the length value to enable a further search for the valid MAC header, wherein the protocol-defined header having one or more characteristics defined in accordance with a wireless communication protocol.

8. A machine accessible media as defined in claim 7, wherein the content, when accessed, causes the machine to detect the invalid header based on at least one of a header type field, an encryption control field, a type field, a length field, or a header check sequence value associated with the invalid header.

9. A machine accessible media as defined in claim 7, wherein the content, when accessed, causes the machine to determine whether a header check sequence value is valid in response to a determination that the extracted length value is invalid, wherein the header check sequence value is associated with the invalid header.

10. A machine accessible media as defined in claim 9, wherein the content, when accessed, causes the machine to calculate a bit-error location in response to a determination that the header check sequence is invalid, and generate a bit-corrected header based on the bit-error location.

11. A machine accessible media as defined in claim 7, wherein the content, when accessed, causes the machine to parse one or more portions of the data region subsequent to the invalid header in response to detecting at least one of a condition indicative of the valid MAC header located at a portion of the data region proximate to the invalid header, a condition indicative of the valid MAC header based on a length offset, or a condition indicative of a valid bit-corrected header.

12. A machine accessible media as defined in claim 7, wherein the content, when accessed, causes the machine to discard one or more portions of the data region subsequent to the invalid header in response to at least one of a failure to detect the valid MAC header located at a portion of the data region proximate to the invalid header, a failure to detect the valid MAC header based a length offset, or a failure to detect an valid bit-corrected header.

13. An apparatus comprising:
  a communication interface to provide a data region having one or more protocol data units; and
  a region parser operatively coupled to the communication interface to detect an invalid header associated with a first protocol data unit of the data region and to search for a valid media access control (MAC) header associated with a second protocol data unit of the data region by identifying the invalid header as a bandwidth request header and searching for the valid MAC header immediately following the invalid header and in response to a failure to detect the valid MAC header to process the invalid header as a protocol-defined header by extracting a length value associated with the invalid header and determining a length offset of the data region based on the length value to enable further searching for the valid MAC header,
  wherein the protocol-defined header has one or more characteristics defined in accordance with a wireless communication protocol.

14. An apparatus as defined in claim 13, wherein the region parser is configured to detect the invalid header based on at least one of a header type field, an encryption control field, a type field, a length field, or a header check sequence value associated with the invalid header.

15. An apparatus as defined in claim 13, wherein the region parser is further configured to determine whether a header check sequence value is valid in response to a determination that the extracted length value is invalid, wherein the header check sequence value is associated with the invalid header.

16. An apparatus as defined in claim 15, wherein the region parser is further configured to calculate a bit-error location in response to determination that the header check sequence value is invalid, and generate a bit-corrected header based on the bit-error location.

17. An apparatus as defined in claim 13, wherein the region parser is configured to parse one or more portions of the data region subsequent to the invalid header in response to detecting at least one of a condition indicative of the valid MAC header located at a portion of the data region proximate to the invalid header, a condition indicative of the valid MAC header based on a length offset, or a condition indicative of a valid bit-corrected header.

18. An apparatus as defined in claim 13, wherein the region parser is configured to discard one or more portions of the data region subsequent to the invalid header in response to at least one of a failure to detect the valid MAC header located at a portion of the data region proximate to the invalid header, a failure to detect the valid MAC header based a length offset, or a failure to detect a valid bit-corrected header.

19. A system comprising:
  one or more antennas to receive a data region having one or more protocol data units; and
  a processor operatively coupled to the one or more antennas wherein the processor is configured to detect an invalid header associated with a first protocol data unit of the data region, and to search for a valid media access control (MAC) header associated with a second protocol data unit of the data region, wherein the search includes identifying the invalid header as a bandwidth request header and searching for the valid MAC header immediately following the invalid header, and to process the invalid header as a protocol-defined header in response to a failure to detect the valid MAC header, wherein the process includes extracting a length value associated with the invalid header and determining a length offset of the data region based on the length value to enable a further search for the valid MAC header,
  wherein the protocol-defined header has one or more characteristics defined in accordance with a wireless communication protocol.

20. A system as defined in claim 19, wherein the processor is configured to parse one or more portions of the data region subsequent to the invalid header in response to detecting at least one of a condition indicative of the valid MAC header located at a portion of the data region proximate to the invalid header, a condition indicative of the valid MAC header based on a length offset, or a condition indicative of a valid bit-corrected header.

21. A system as defined in claim 19, wherein the processor is configured to discard one or more portions of the data region subsequent to the invalid header in response to at least one of a failure to detect the valid MAC header located at a portion of the data region proximate to the invalid header, a failure to detect the valid MAC header based a length offset, or a failure to detect a valid bit-corrected header.

* * * * *

UNITED STATES PATENT AND TRADEMARK OFFICE
CERTIFICATE OF CORRECTION

PATENT NO.        : 7,548,559 B2                                          Page 1 of 1
APPLICATION NO. : 11/373422
DATED             : June 16, 2009
INVENTOR(S)       : Steven J. Aarnio It is certified that error appears in the above-identified patent and that said Letters Patent is hereby corrected as shown below:

Column 10
Line 33, "...response to determination..." should read --...response to a determination...--.

Column 10
Line 49, "...based a length offset,..." should read --...based on a length offset, ...--.

Column 10
Lines 51-52, "An article of manufacture including content, which when accessed, causes a machine to:..." should read --A machine accessible media embodying machine accessible instructions when executed cause a machine to:...--.

Column 11
Line 35, "...based a length offset,..." should read --...based on a length offset,...--.

Column 11
Line 36, "...an valid bit-corrected header." should read --...a valid bit-corrected header.--.

Column 12
Line 8, "...response to determination..." should read --...response to a determination...--.

Column 12
Line 24, "...based a length offset,..." should read --...based on a length offset,...--.

Column 12
Line 60, "...based a length offset,..." should read --...based on a length offset,...--.

Signed and Sealed this

Twenty-third Day of November, 2010

David J. Kappos
*Director of the United States Patent and Trademark Office*